United States Patent [19]

Ricketts

[11] Patent Number: 4,475,208
[45] Date of Patent: Oct. 2, 1984

[54] WIRED SPREAD SPECTRUM DATA COMMUNICATION SYSTEM

[76] Inventor: James A. Ricketts, 1412 16th St., Lubbock, Tex. 79401

[21] Appl. No.: 340,022

[22] Filed: Jan. 18, 1982

[51] Int. Cl.³ .......................... H04K 1/02; H04K 1/10
[52] U.S. Cl. .......................................... 375/1; 179/3; 375/201; 370/18
[58] Field of Search .......................... 375/1, 2.1, 2.2; 370/18, 21; 455/26, 30, 39, 61, 68, 72; 179/1.5 M, 2 DP, 2.51, 3, 4, 84 R, 84 UF; 178/22.01, 22.13, 22.15

[56] References Cited

U.S. PATENT DOCUMENTS

| | | | |
|---|---|---|---|
| 3,241,066 | 3/1966 | Ligotky | 179/3 |
| 3,701,019 | 10/1972 | Jackson | 375/1 |
| 3,845,391 | 10/1974 | Crosby | 455/61 |
| 4,291,409 | 9/1981 | Weinberg et al. | 375/1 |
| 4,383,280 | 5/1983 | Copeland | 375/2.1 |

Primary Examiner—Benedict V. Safourek
Attorney, Agent, or Firm—Litman, Day & McMahon

[57] ABSTRACT

A wired spread spectrum data communication system includes a modulator and a demodulator coupled to a transmission line having other signals thereon. The modulator includes a pseudo-noise (PN) generator and a clock providing, respectively, a PN code signal and a clock signal for combination in exclusive-OR (XOR) gates with a low bit rate data signal. The demodulator includes a phase locked loop for clock signal recovery and an identical PN generator providing, respectively, a local clock signal and PN code signal for combination in XOR gates with the encoded data signal for the removal of the clock and PN code signal components from the encoded data signal. The demodulator further includes circuitry for synchronizing the local PN code signal with the PN code component of the incoming encoded data signal.

22 Claims, 5 Drawing Figures

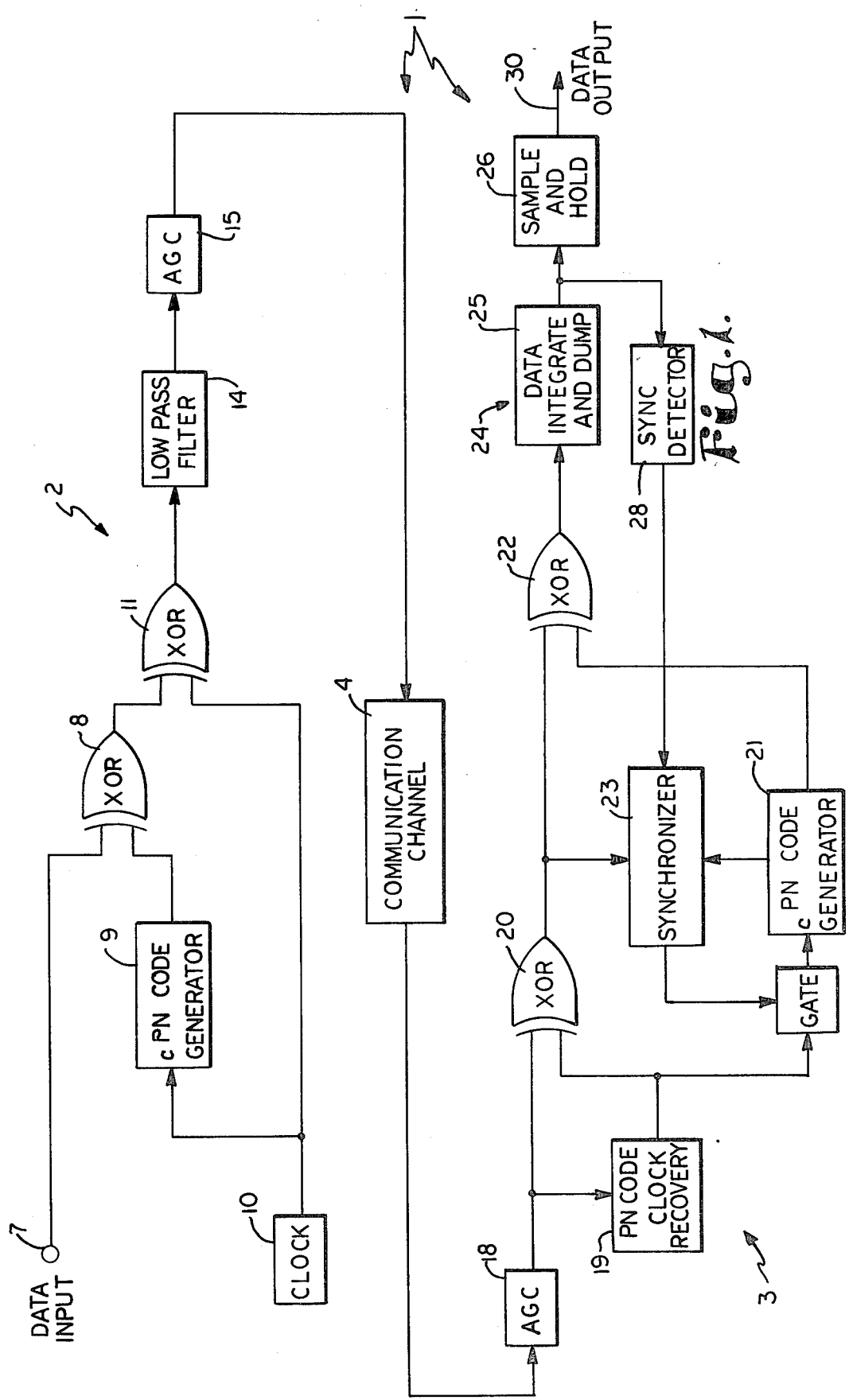

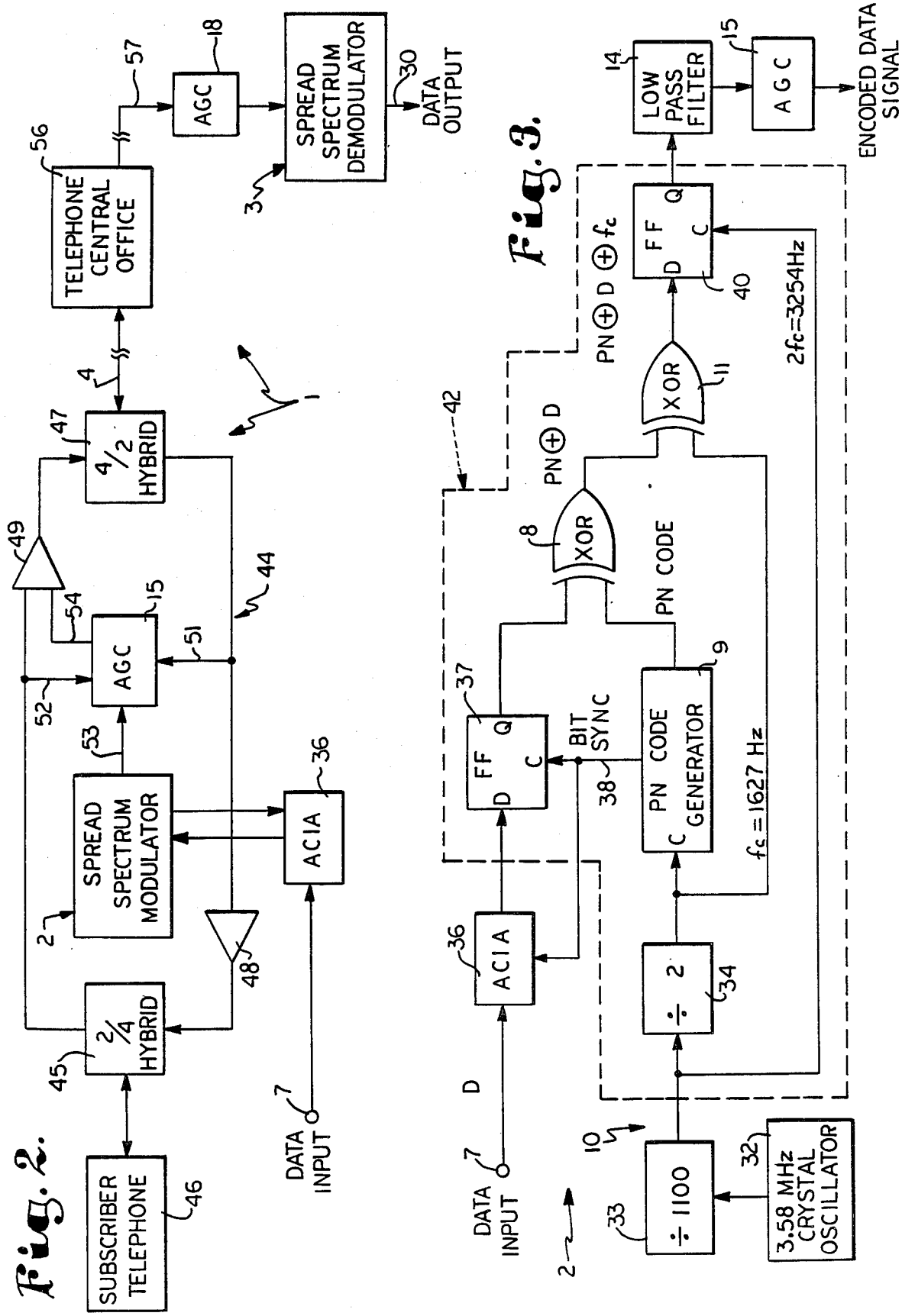

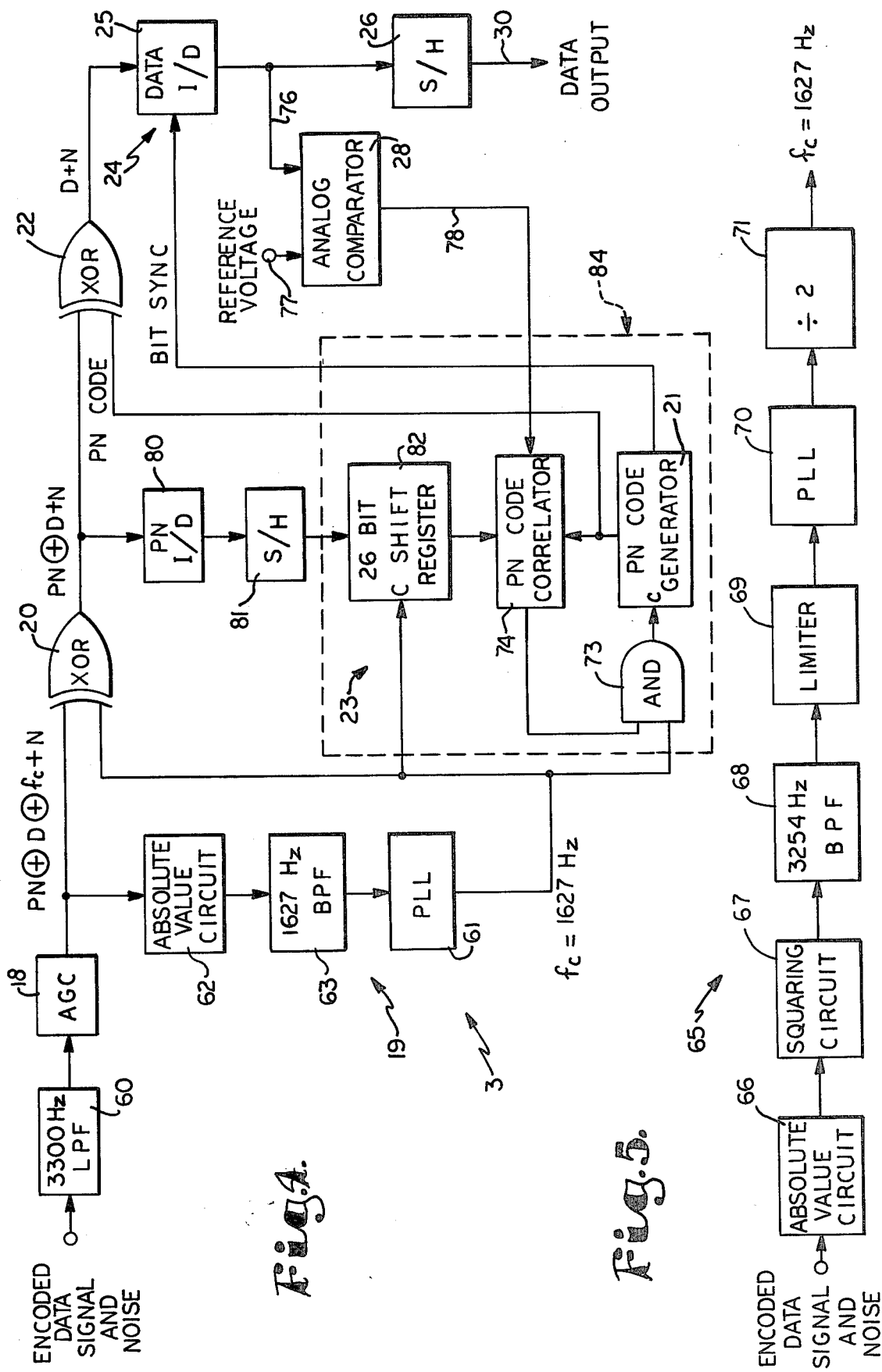

WIRED SPREAD SPECTRUM DATA COMMUNICATION SYSTEM

FIELD OF THE INVENTION

The present invention relates to digital data communication systems and, more particularly, to a spread spectrum data communications system for use on transmission lines designed primarily for purposes other than the transmission of digital data.

BACKGROUND OF THE INVENTION

In spread spectrum communication systems, the information to be transmitted is encoded with a pseudo-random or pseudo-noise (PN) code. A pseudo-noise code is a serial stream of logic ones and zeros generated by a clocked shift register having feedback connections from selected stages through exclusive-OR gates to the input of the register. The sequence of ones and zeros of the bit stream appears random over the short run but, in reality, is a repeating sequence. The length of the bit sequence before repetition occurs is determined by the number of stages in the shift register. The manner of combination of the PN code with the information signal is by modulo-2 addition which is identical to the operation performed by an exclusive-OR gate.

The modulation of the information signal by a PN code causes the modulated signal to occupy a much greater bandwidth than would be required by a carrier signal modulated by the information signal alone. Because of the wideband signal spectra generated by PN code modulation, the power transmitted is low in any narrow band of frequencies. In order to demodulate a spread spectrum coded signal, an exact replica of the PN code must be combined in proper synchronism with the coded signal. This requirement prevents interception of the information signal by a casual listener. For this reason, spread spectrum encoding is often employed, along with other measures, to encrypt confidential messages.

Heretofore, spread spectrum techniques have been employed principally in radio communications. The use of spread spectrum encoding on wired communication facilities has been limited because of the relatively narrow bandwidth of most wired transmission lines. Known uses of spread spectrum techniques on wired transmission lines include spread spectrum encoding of voice signals, that is vocal scrambling, to secure telephone conversations and the provision of spread spectrum encoded supervisory signals on dedicated telephone lines used for interconnecting local burglar alarm stations with central stations.

SUMMARY OF THE INVENTION

The present invention provides a method and apparatus for data communication over non-dedicated telephone lines and other types of transmission lines without interference to the signals normally propagated on such lines by spread spectrum encoding a low bit rate data signal and controlling the level of the encoded signal in relation to the signal level normally or frequently on the line.

OBJECTS OF THE INVENTION

The principal objects of the present invention are: to provide a method for low to medium bandwidth spread spectrum data communication on wired communication facilities; to provide a method for communicating data over already existing transmission lines; to provide an apparatus for practicing such a method particularly on voice grade telephone lines; to provide such a system for use on telephone lines during vocal communication thereon without mutual interference between data and vocal communication; to provide such a system including a modulator portion for encoding a low bit rate data signal with a pseudo-noise (PN) code and a clock signal; to provide such a system including a demodulator portion including a phase locked loop for recovering the clock signal, a PN generator identical to the one in the modulator for providing the demodulator PN code, a PN generator synchronizer, and noise removing circuitry; to provide such a system wherein a plurality of data signals may be encoded on the same line without mutual interference by employing different PN codes; to provide such a system wherein many of the functions of the modulator and demodulator, particularly the PN generators, may be implemented as suitably programmed microprocessors; and to provide such a method and apparatus for wired spread spectrum data communication which is economical to manufacture, positive and efficient in operation, and which is particularly well adapted for its intended purpose.

Other objects and advantages of this invention will become apparent from the following description taken in conjunction with the accompanying drawings wherein are set forth, by way of illustration and example, certain embodiments of the present invention.

The drawings constitute a part of the specification, include an exemplary embodiment of the present invention, and illustrate various objects and features thereof.

BRIEF DESCRIPTION OF THE DRAWINGS

FIG. 1 is a block diagram illustrating a wired spread spectrum data communication system according to the present invention.

FIG. 2 is a block diagram illustrating the manner of connection of the data communication system to a subscriber type telephone line.

FIG. 3 is a block diagram illustrating a modulator portion of the spread spectrum data communication system.

FIG. 4 is a block diagram of a demodulator portion of the spread spectrum data communication system.

FIG. 5 is a block diagram of an alternative embodiment of the clock recovery circuit for the demodulator portion of the system.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a wired spread spectrum data communication system including a spread spectrum modulator 2 and a spread spectrum demodulator 3 interconnected over a wired communications facility 4. The modulator 2 generally includes a data input 7 receiving a low bit rate digital data signal for combination in a first exclusive-OR gate 8 with a pseudo-noise (PN) code provided by a PN code generator 9 resulting in a spectrum spread signal at the output of the gate 8. A clock circuit 10 provides a clock signal for clocking the PN code generator 9 and for combination in a second XOR gate 11 with the spectrum spread signal to provide an encoded data signal for propagation on the communication channel 4. The modulator 2 preferably includes a low pass filter 14 and an automatic gain control (AGC) circuit 15 to prepare the encoded data signal for transmission.

The demodulator 3 includes an automatic gain control circuit 18 to build up the incoming signal for processing in the demodulator 3. The demodulator includes a PN code clock recovery means 19 for deriving the clock signal from the encoded data signal for combination in a third XOR gate 20 with the encoded data signal for removal of the clock signal therefrom to provide declocked signal. The recovered clock signal is also provided to a demodulator PN code generator 21 to cause same to generate a PN code for combination in a fourth XOR gate 22 with the declocked signal to provide a despread signal consisting of the original data signal plus noise. The PN code provided by the generator 21 must be an exact duplicate or replica of the original encoding PN code. Further, the demodulating PN code must be in synchronism with the PN code component of the declocked signal in order for same to be removed from the declocked signal. Therefore, the demodulator 3 includes a synchronizer circuit 23 for controlling the generation of the local PN code. The demodulator 3 includes noise removal means 24 for removing noise from the demodulated data signal. In the illustrated embodiment, the noise removal means 24 includes an integrate and dump circuit 25 in combination with a sample and hold circuit 26 for this purpose. Finally, a synchronism or sync detector 28 is provided to determine if the locally generated PN code is in synchronism with the PN code component of the encoded data signal. The demodulated data signal is provided at a data output terminal 30 for use as needed.

The data communications system 1 is suitable for communicating data for a variety of purposes. A preferred application of the system 1 is in the automatic reading of electric, gas, and water meters over telephone or cable television lines from a central location. Other uses include: the communication of emergency information such as burglar and fire alarms, requests for medical assistance for handicapped persons, aged persons, and persons with chronic and critical medical problems; the remote control of equipment such as heating, lighting, and the like; and the communication of digital information such as texts, messages, figures, and the like. The system 1 is adaptable for communication over a variety of types of communication channels such as telephone lines, television cables, wired music systems, intercom systems, and electrical power wiring within a complex. While the system 1 is preferably applied over wired communications channels, the system 1 is adaptable for use over mobile and fixed radio communication channels also. Each of the types of communication channels listed normally has signal traffic thereon. The spread spectrum encoding of the data signal, the limiting of the bandwidth of the encoded signal, and control of the signal level of the encoded data signal in relation to the level of the signals normally handled by such channels ensures that the encoded signals added to the communication channel by the system 1 will not interfere with or be interfered with by the conventional signals carried on such channels.

Referring to FIG. 3, the frequency of the clock circuit 10 is determined by the usable bandwidth of the communication channel 4 and/or the frequency response thereof. The modulator 2 illustrated in FIG. 3 is adapted for use on a conventional voice grade subscriber telephone line. Such telephone lines have a typical bandwidth of 300 to 3000 hertz. As is known to those skilled in the art, a spread spectrum encoded signal has a signal spectrum including a principal lobe at a so-called center frequency with alternating nulls and minor lobes occurring at integral multiples of the center frequency above and below the principal lobe. In the modulator 2, it is desirable to locate the principal lobe of the encoded signal within the bandwidth of the voice grade telephone line. Therefore, the clock frequency in the illustrated embodiment is 1627 hertz. As illustrated, the clock 10 is constructed as a 3.58 megahertz crystal oscillator 32 followed by a divide-by-1100 circuit 33 and a divide-by-2 circuit 34. Alternatively, the clock signal could be provided by a 1627 hertz crystal oscillator. However, frequency standard crystals are generally able to establish the frequency of an oscillator within a given number of hertz of the nominal frequency thereof whether the frequency is low or high, within reasonable limits. By generating a high order multiple of the frequency desired, and frequency dividing to obtain the desired frequency, the frequency error is also divided by the same factor. Therefore, the 3.58 megahertz oscillator is employed along with the dividers 33 and 34 for greater frequency accuracy.

The heart of the spread spectrum oscillator 2 is the PN code generator 9. A PN code generator is a clocked shift register with feedback connections or taps connected through XOR gates to the input of the register. The length of the sequence generated is determined by the number of stages in the generator and the pattern of feedback connections. The maximum number of bits generated before repetition of the sequence occurs is termed a maximal length sequence and is equal to $2^n - 1$ wherein n is equal to the number of stages in the shift register. Not all patterns of feedback connections generate maximal length sequences. Feedback connection patterns for a given number of stages in a shift register which will generate maximal length codes are available in reference works and would be available to those skilled in the art. In the illustrated modulator 2, the PN code generator is a thirteen stage or thirteen bit shift register; therefore, a maximal length code sequence generated thereby would have 8191 bits before repetition occurs.

While the PN code generator 9 may be constructed or implemented as discrete shift register elements and XOR gates, the preferred PN code generator 9 is a suitably programmed microprocessor. Further, other functions of the modulator 2 may be performed by such a microprocessor as will be explained. The data signal may be timed into the modulator 2 by means such as (but not limited to) an asynchronous communications interface adapted (ACIA) 36 in combination with a flip-flop 37. At the beginning of each bit of the data signal, a bit sync pulse is provided by the PN code generator 9 on a bit sync line 38 to the clock input of the flip-flop 37. In the illustrated modulator 2, each bit of the data signal has a duration equal to a complete code sequence (8191 bits). The bit sync pulse, therefore, enables the flip-flop 37 to assume at an output thereof the logic state of the incoming data pulse and maintain that logic state until the next bit sync pulse occurs.

The PN code signal and data signal are combined by modulo-2 addition in the XOR gate thereby encoding or spectrum spreading each bit of the data signal with the PN code. The spectrum spread signal is combined in the XOR gate 11 with the clock signal in order to provide a recoverable clock signal to the demodulator 3. The encoded data signal is passed through an additional flip-flop 40 which is enabled by a signal at twice the clock frequency. The enabling signal is derived from the oscillator signal prior to the divide-by-two circuit 34. The flip-flop 40 corrects minor timing errors caused by differences in propagation times through the various branches of the modulator 2.

In the illustrated modulator 2, the PN code generator 9, divide-by-2 circuit 34, flip-flops 37 and 40, and XOR gates 8 and 11 are all implemented as a microprocessor 42. A microprocessor which is suitable to perform the functions of the modulator 2 is the MC6805 microprocessor from Motorola, Inc. Alternatively, other types of microprocessors could be employed.

The encoded data signal is filtered by the low pass filter 14 to remove the upper lobes of the signal in order to avoid introducing unnecessary noise on the communication channel 4. Finally the level of the filtered, encoded data signal is controlled by the automatic gain control circuit 15 which is responsive to the level of line signals and noise on the communication channel 4.

Referring to FIG. 2, in order for the automatic gain control circuit 15 to sense incoming and outgoing line signals for purposes of adjusting the level of the encoded data signal, the spread spectrum modulator 2 is connected through a hybrid arrangement 44 to the telephone line 4. The arrangement 44 includes a two-wire to four-wire (2/4) hybrid circuit 45 connecting the subscriber telephone instrument 46 thereto. Similarly, a four-wire to two-wire (4/2) hybrid circuit 47 connects the arrangement 44 to the telephone line 4. The arrangement 44 includes an amplifier 48 for amplifying incoming signals and an amplifier 49 for amplifying outgoing signals. The automatic gain control circuit 15 includes a first sensing input 51 for sensing incoming line signal levels and a second sensing input 52 for sensing outgoing line signal levels. The AGC circuit 15 includes a signal input 53 receiving the encoded data signal and a signal output 54 which is connected to the outgoing signal amplifier 49. Upon sensing a line signal, either incoming or outgoing, the AGC circuit 15 is operative to adjust the level of the encoded data signal to a selected level below the level of the line signal which is sensed. In the illustrated system 1, the AGC circuit 15 is operative to adjust the encoded data signal to a level which is substantially 15 decibels below the level of the line signal sensed. The telephone line 4 is routed through a telephone central office 56 to the receiving station at which is installed the spread spectrum demodulator 3. The telephone line 4 is connected to a line 57 extending from the central office 56 to the receiving station in a manner known as a direct bridge connection which avoids the normal switching circuitry within the telephone central office 56.

Referring to FIG. 4, the demodulator 3 receives the encoded data signal having noise therein and is operative to remove the PN code component, the clock signal component, and the noise in order to provide the original data signal at the output 30 thereof. The incoming signal is first filtered by a 3300 hertz low pass filter 60. The filter 60 preferably includes notch filter portions tuned to 60 and 180 hertz in order to remove power line noise. The filtered signal is passed through the automatic gain control circuit 18 in order to provide a constant signal level to the remainder of the demodulator 3. The clock recovery circuit 19 includes, principally, a phase locked loop 61 which is adapted to track the clock frequency component of the encoded signal. The encoded signal is passed through an absolute value circuit 62 which is employed as a type of automatic gain control circuit. From there the signal passes through a 1627 hertz bandpass filter 63 to thereby isolate the clock frequency component of the signal. The output of the phase locked loop 61 is the clock signal having a frequency of 1627 hertz. The clock signal is applied to the XOR gate 20 along with the encoded data signal in order to remove the clock component therefrom to provide the declocked signal.

FIG. 5 illustrates an alternative embodiment 65 of the clock recovery circuit. The clock recovery circuit 65 includes an absolute value circuit 66 and a squaring circuit 67. The output voltage of the squaring circuit 67 is proportional to the square of the input voltage, and the frequency of the output signal is twice the input frequency. The squaring circuit 67 is employed in order to increase the signal-to-noise ratio of the received encoded data signal. As a result of the frequency doubling by the squaring circuit 67, the squared signal is bandpass filtered at double the clock frequency in a 3254 hertz bandpass filter 68. The filtered signal is passed through an amplitude limiter 69 and then applied to a phase locked loop 70 adapted to track the 3254 hertz signal. The output from the phase lock loop 70 is passed through a divide-by-2 circuit 71 to provide the clock signal at 1627 hertz. While the clock recovery circuit 65 is adequate to recover the clock signal, the phase of the clock signal is altered, particularly in the divider circuit 71. Therefore, subsequent circuitry in the demodulator 3 is complicated by the necessity of choosing the correct clock phase. For this reason, the clock recovery circuit 19 is preferred in the data communications system 1.

The PN code component of the declocked signal is removed therefrom by combining an exact, locally generated replica of the encoding PN code with the declocked signal in the XOR gate 22. The locally generated PN code must be exact not only in its constitution of logic ones and zeros, but also must be synchronized with the PN component of the declocked signal.

The demodulating PN code is provided by the PN code generator 21 which has the same pattern of feedback connections as the encoding PN code generator and is clocked at the same frequency. In order to control the operation of the PN code generator 21, the clock signal is provided thereto through an AND gate 73. A second input to the gate 73 is connected to a PN code correlator 74 which is operative to provide an enabling signal to the gate 73 to allow the clock signal to pass therethrough to the clock input of the PN code generator 21 only when the code sequence from the generator 21 is in synchronism with the PN code component of the declocked signal. When the PN code component of the declocked signal and the code sequence of the generator 21 are in synchronism, the correlator 74 is considered to be in a track mode, and in this mode the correlator 74 supplies a logic one to the gate 73.

In the illustrated demodulator 3, synchronism between the two PN codes is detected by the synchronism detector 28. The synchronism detector 28 is an analog comparator having one input 76 connected to the output of the data integrate and dump circuit 25. A second input 77 of the comparator 28 is connected to a reference voltage. Whenever the voltage output from the integrate and dump circuit 25 exceeds the reference voltage, a logic one is provided on an output 78 of the comparator 28 which is connected to the correlator 74. The integrator 25 has an integrating time constant equal to the length of one bit of the original data signal. At the end of each data bit, if the bit is a logic one and the two PN codes are in synchronism, the output voltage of the integrator 25 will be greater than the reference voltage on the input 77 of the comparator 28 whereby the logic one is provided to the correlator 74. If the PN codes are not synchronized, the output voltage of the integrator will be less than the reference voltage such that a logic zero is provided to the correlator 74.

The reason why the output voltage of the integrator 25 will be less than the reference voltage is that if the PN codes are not synchronized, upon combination in the XOR gate 22, the resultant signal will be a substantially random sequence of pulses of various lengths instead of a relatively long interval pulse. Integration of the random pulses will, therefore, result in a voltage output from the integrator 25 which is lower than the reference voltage. The correlator 74 is operative to count the number of successive logic zeros from the comparator 28, and upon counting a selected number of logic zeros determines that the PN codes are out of synchronism. Upon this occurrence, the correlator 74 provides a logic zero to the gate 73 whereby the clock signal is inhibited from reaching the PN code generator 21, thereby preventing same from generating the PN code sequence. When synchronism has been lost between the two PN codes, the correlator 74 changes to a synchronize mode and seeks to reestablish synchronism between the PN codes.

This arrangement for detecting synchronism, of course, places constraints upon the number of successive logic zero bits which may be allowed to occur in the original data signal. The reason for this is that even if the PN codes are in synchronism, upon combination in the XOR gate 22, the resultant is a logic zero which, upon integration results in substantially a zero output from the integrator 25. This output when compared to the reference voltage causes a logic zero to be output from the comparator 28 to the correlator 74. If the number of consecutive logic zeros in the original data signal were equal to or greater than the selected number of zeros which signal to the correlator that synchronism has been lost, the correlator 74 would unecessarily enter the synchronize mode. By limiting the number of consecutive zeros in the data signal to less than the selected number of logic zeros which signals loss of synchronism to the correlator 74, the correlator is able to determine when synchronism has been truly lost.

In the illustrated demodulator 3, the correlator 74 establishes synchronism between the two PN codes by stopping the generator 21, setting a selected pattern of logic conditions in the shift register thereof, clocking this content of code bits out of the generator 21, and determining when this pattern has occurred in the PN code component of the declocked signal. In a maximal length PN code sequence, there is a single occurrence of logic ones equal in number to the number of stages in the shift register generating same. For this reason, for synchronization purposes, the correlator 74 resets the generator 21 to a condition of all logic ones.

In order to monitor the declocked signal for a condition for all logic ones, the declocked signal is passed through a PN integrate and dump circuit 80 and thereafter to a sample and hold circuit 81. The sample and hold circuit 81 is connected to a clocked shift register 82 which is in turn connected to the correlator 74. When a clock recovery circuit such as the circuit 65 (FIG. 5) is employed, errors can occur during integration because of the ambiguity of the phase of the clock signal. For this reason, the integrator is set to integrate over the time period equal to one-half the period of the clock frequency. The sample and hold circuit 81 is operative to square up the output pulses from the integrator 80. The pulses from the sample and hold circuit 81 are fed into the shift register 82 which in the illustrated demodulator 3, consists of 26 stages or bits. It should be pointed out that if the current data bit is a logic one, the thirteen consecutive ones will arrive at the integrator 80 as thirteen consecutive logic zeros. However, in a maximal length PN code sequence, the condition of a number of logic zeros equal to the number of stages in the generating shift register never occurs. Therefore, the correlator 74 is adapted to interpret such a sequence of all logic zeros as a sequence of all logic ones. When either 26 consecutive logic ones or 26 consecutive logic zeros have been clocked through the shift register 82 into the correlator 74, the correlator outputs a logic one to the gate 73 whereby the PN code generator 21 is restarted in synchronism with the PN code component of the declocked signal.

As in the modulator 2, the PN code generator 21 and other functions of the synchronizer 23 are implemented as a suitably programmed microprocessor 84. These other functions include the AND gate 73, the PN code correlator 74, and the shift register 82.

Assuming that the code sequence from the generator 21 is synchronized with the PN code component of the declocked signal, combination of these signals results in a despread signal comprising the original data signal plus some noise. As is known by those skilled in spread spectrum techniques, the major portion of noise present in the encoded signals is spectrum spread upon despreading of the encoded signal whereby the power of the noise component is greatly diminished. The remaining noise component is removed from the despread signal by integrating same over the period of a bit of the data signal in the integrator 25. Over such a relatively long time interval, the effect of the noise component averages out thereby leaving the original data signal. The output of the integrator 25 is passed through the sample and hold circuit 26 in order to square up the waveform of the data pulses. The original data signal is thereby available at the data output 30 for utilization as desired. The beginning of each data pulse is marked by a bit sync pulse provided by the PN code generator 21 to the integrate and dump circuit 25. The sync pulse may be employed to signal that a valid data bit has been received and, further, may be employed to actuate the dump portion of the integrator circuit 25.

While certain forms of the present invention have been described and illustrated, it is not to be limited thereto except insofar as such limitations are included in the following claims.

What is claimed and desired to secure by Letters Patent is:

1. A method for communication of a data signal over a low to medium frequency response and bandwidth transmission line having at times a line signal thereon substantially without interference to or by said line signal, said data signal and said line signal occupying substantially the same frequency band, said method comprising the steps of:
   (a) spread spectrum encoding a data signal by combining same with a pseudo-noise (PN) code signal;
   (b) coupling said encoded data signal to said line for transmission thereon;
   (c) adjusting the level of said encoded data signal to a selected level below the level of said line signal when present; and
   (d) decoding said encoded data signal as adjusted by removing said PN code signal therefrom to provide said data signal.

2. A method as set forth in claim 1 including the step of:
   (a) providing a non-dedicated voice grade subscriber telephone line as said transmission line.

3. A method as set forth in claim 1 including the step of:
   (a) adjusting said level of said encoded data signal by means of an automatic gain control circuit which is responsive to the level of said line signal.

4. A method for communication of a data signal over a low to medium frequency response and bandwidth transmission line having at times a line signal thereon substantially without interference to or by said line signal, said data signal and said line signal occupying substantially the same frequency band, said method comprising the steps of:
   (a) spectrum spreading a data signal by combining same with a pseudo-noise (PN) code signal to provide a spectrum spread signal;
   (b) clocking said spectrum spread signal by combining same with a clock signal to provide an encoded data signal;
   (c) coupling said encoded data signal to said line for transmission thereon;
   (d) adjusting the level of said encoded data signal to a selected level below the level of said line signal when present;
   (e) receiving said encoded data signal as adjusted and having noise therewith including at times said line signal;
   (f) declocking said encoded data signal as adjusted by removing said clock signal therefrom to provide a declocked signal;
   (g) despreading said declocked signal by removing said PN code signal therefrom to provide a despread signal; and
   (h) removing said noise from said despread signal to provide said data signal.

5. A method as set forth in claim 4 including the step of:
   (a) providing a non-dedicated voice grade subscriber telephone line as said transmission line.

6. A method as set forth in claim 4 including the step of:
   (a) adjusting said level of said encoded data signal by means of an automatic gain control circuit which is responsive to the level of said line signal.

7. A method as set forth in claim 4 including the step of:
   (a) combining said PN code signal with said data signal by exclusive-ORing said PN code signal and said data signal.

8. A method as set forth in claim 4 including the step of:
   (a) combining said clock signal with said spectrum spread signal by exclusive-ORing said spectrum spread signal and said clock signal.

9. A method as set forth in claim 4 wherein said declocking step includes:
   (a) deriving a clock signal replica of said clock signal from said encoded data signal by means of a phase locked loop; and
   (b) combining said clock signal replica with said encoded data signal in an exclusive-OR gate to provide said declocked signal.

10. A method as set forth in claim 4 wherein said PN code signal is a first PN code signal and said despreading step includes:
    (a) generating a second PN code signal identical to said first PN code signal;
    (b) synchronizing said second PN code signal with the first PN code signal component of said declocked signal; and
    (c) combining the synchronized second PN code signal with said declocked signal in an exclusive-OR gate to provide said despread signal.

11. A method as set forth in claim 10 wherein said synchronizing step is preceded by the step of detecting whether said second PN code signal is synchronized with the first PN code signal component of said declocked signal, the sync detecting step including the steps of:
    (a) integrating said despread signal over the time period of a data bit of said data signal to provide an integral voltage;
    (b) comparing said integral voltage with a selected reference voltage; and
    (c) upon said integral voltage being exceeded by said reference voltage for a selected number of successive data bit periods, performing said synchronizing step.

12. A method as set forth in claim 10 wherein said synchronizing step includes:
    (a) resetting a PN code generator means employed to generate said second PN code signal to a selected bit pattern;
    (b) clocking said PN code generator means until the last bit of said bit pattern has been clocked out of said PN code generator means; and
    (c) upon the last bit of said selected bit pattern being detected in said declocked signal, restarting said PN generator means in synchronism with the PN code signal component of said declocked signal.

13. A method as set forth in claim 12 wherein said resetting step includes the step of:
    (a) resetting said PN code generator means which generates said second PN code signal to a pattern of all logic ones.

14. A method as set forth in claim 4 wherein said noise is removed from said despread signal by the steps of:
    (a) integrating said despread signal over the time period of one bit of said data signal to provide an integrated signal; and
    (b) sampling and holding said integrated signal thereby providing said data signal without said noise.

15. In combination:
(a) a low to medium frequency response and bandwidth transmission line for communicating a line signal thereon;
(b) modulator means coupled with said line, said modulator means receiving a data signal, providing on said line a spread spectrum encoded data signal in substantially the same frequency band as said line signal, and controlling the level of said encoded data signal, said data signal being so encoded and controlled in level as to substantially avoid interference with or by said line signal on said line; and
(c) demodulator means coupled with said line remote from said modulator means, said demodulator means receiving and decoding said encoded data signal.

16. A combination as set forth in claim 15 wherein said transmission line is a non-dedicated voice grade subscriber telephone line.

17. A combination as set forth in claim 15 wherein:
(a) said transmission line has a line signal level thereon during communication of said line signal on said line; and
(b) said modulator means includes an automatic gain control (AGC) responsive to said line signal level on said line to adjust the encoded data signal level to a selected level below said line signal level during communication of said line signal on said line to avoid interference therewith.

18. A combination as set forth in claim 15 wherein said modulator means includes:
(a) clock means providing a clock signal;
(b) a modulator pseudo-noise (PN) generator means providing a first PN code signal;
(c) a first modulator exclusive-OR (XOR) gate means receiving and combining therein said first PN code signal and a low bit rate data signal and providing a spectrum spread signal; and
(d) a second modulator XOR gate means having said clock means and said first modulator XOR gate means connected thereto, said second XOR gate means receiving and combining therein said spectrum spread signal and said clock signal and providing said encoded data signal.

19. A combination as set forth in claim 15 wherein said encoded data signal as received comprises a data signal exclusive-ORed with a first pseudo-noise (PN) code signal exclusive-ORed with a clock signal and noise, and said demodulator means includes:
(a) clock recovery means receiving said encoded data signal and deriving said clock signal therefrom;
(b) a demodulator PN code generator means providing a second PN code signal identical to said first PN code signal;
(c) synchronizing means synchronizing said second PN code signal with the first PN code signal component of said encoded data signal as received in said demodulator means;
(d) a first demodulator exclusive-OR (XOR) gate means receiving and combining therein said encoded data signal and said clock signal thereby removing the clock component from said encoded data signal to provide a declocked signal; and
(e) a second demodulator XOR gate means receiving and combining therein said declocked signal and the synchronized second PN code signal thereby removing the PN component from said declocked signal to provide a despread signal including said data signal and said noise; and
(f) noise removal means receiving said despread signal and removing said noise from same thereby providing said data signal.

20. A combination as set forth in claim 19 wherein said clock recovery means includes a phase locked loop.

21. A combination as set forth in claim 19 wherein said synchronizing means includes:
(a) sync detector means having a first output signal when the PN code component of said encoded data signal and said second PN code signal are synchronized and a second output signal when said PN code component and said second PN code signal are not synchronized;
(b) clock gate means communicating said clock signal to said demodulator PN code generator means only upon said clock gate means being enabled, said demodulator PN code generator means providing said second PN code signal only upon receiving said clock signal; and
(c) PN code correlator means receiving said second PN code signal, operatively receiving said declocked signal, and having said sync detector means and said clock gate means connected thereto, said correlator means enabling said clock gate means to communicate said clock signal to said demodulator PN code generator means upon receiving said first output signal from said sync detector means.

22. A combination as set forth in claim 19 wherein said noise removal means includes:
(a) an integrate and dump circuit receiving said despread signal and integrating same over the time period of a bit of said data signal; and
(b) a sample and hold circuit connected to said integrate and dump circuit and providing at an output of said sample and hold circuit said data signal.

* * * * *